United States Patent [19]
Holly

[11] 3,765,056
[45] Oct. 16, 1973

[54] MOLDING APPARATUS

[75] Inventor: James A. Holly, Park Forest, Ill.

[73] Assignee: Hollymatic Corporation, Park Forest, Ill.

[22] Filed: Oct. 20, 1971

[21] Appl. No.: 191,027

[52] U.S. Cl. .................................................. 17/32
[51] Int. Cl. ............................................ A22c 7/00
[58] Field of Search .................. 17/32; 425/251, 252

[56] References Cited
UNITED STATES PATENTS

| | | | |
|---|---|---|---|
| 3,491,401 | 1/1970 | Holly | 17/32 |
| 1,757,447 | 5/1930 | Comstock | 17/32 |
| 3,347,176 | 10/1967 | Hall | 17/32 X |
| 3,296,655 | 1/1967 | Vidsak et al. | 17/32 |

Primary Examiner—Louis G. Mancene
Assistant Examiner—D. L. Weinhold
Attorney—Hofgren, Wegner, Allen, Stellman and McCord

[57] ABSTRACT

A molding apparatus for molding a round patty of plastic fool material such as ground raw meat, fish and the like that shrinks out of round during cooking including a pressurized supply means for providing a supply of the material into a round mold cavity closed on opposite ends by closure members and angled guide means in a closure member having a vertex at the opening through which the material is supplied under pressure and diverging sides extending therefrom, a preferred form of such guide means being concentric arcuate grooves in the closure member which may be circular grooves that are concentric with each other and with the center of the cavity.

15 Claims, 6 Drawing Figures

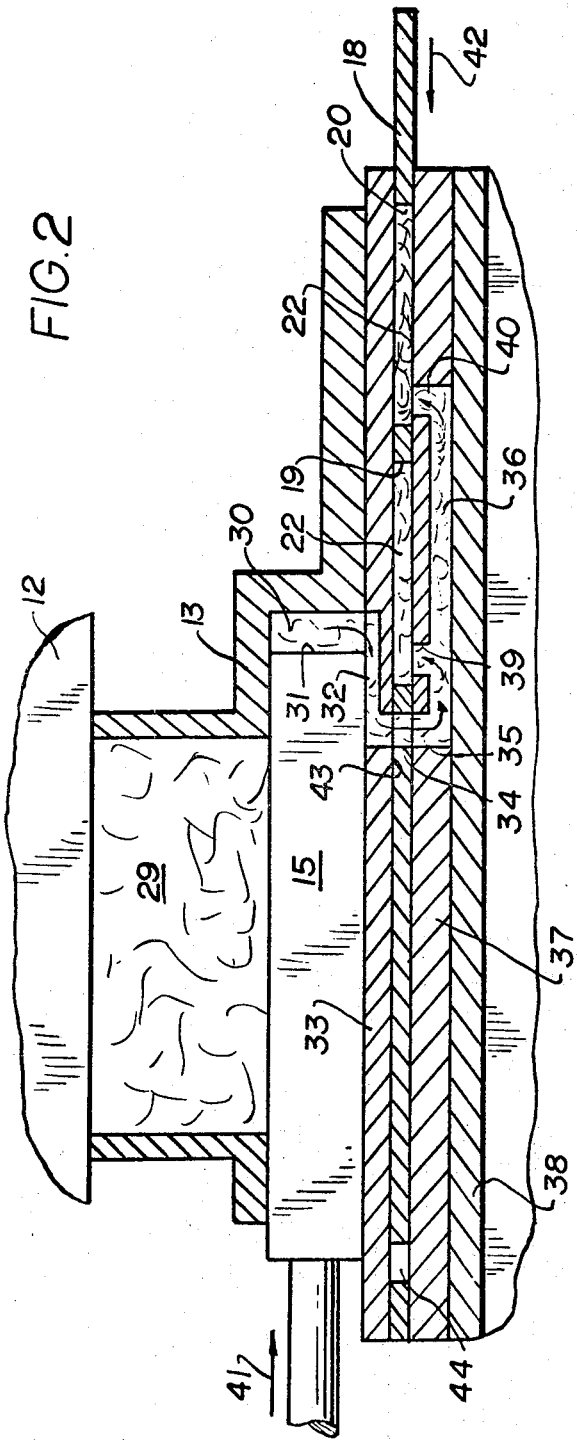
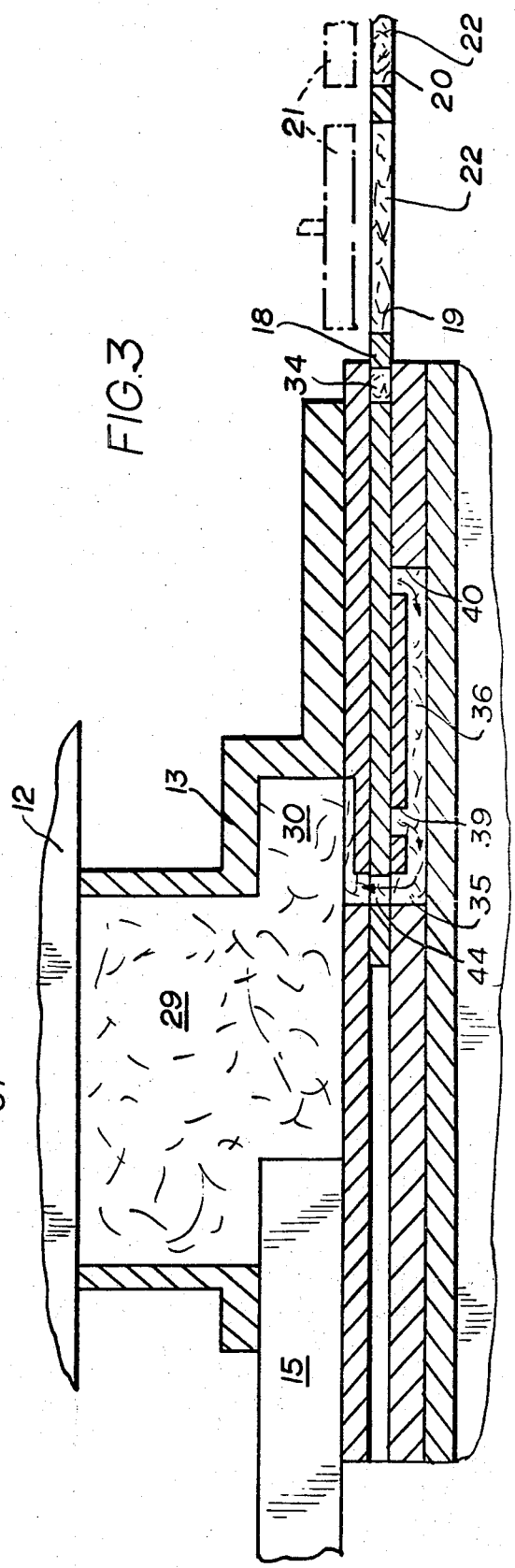

Patented Oct. 16, 1973

MOLDING APPARATUS

BACKGROUND OF THE INVENTION

The field of the invention is apparatus for molding a round patty of plastic food material that tends to shrink out of round during cooking of which a good example is ground raw meat. It has been found that when the round patties are produced by high pressure injection molding into a round patty shaped cavity the orientation of fibers is such that during cooking the round patty shrinks out of round. Such a patty does not have the eye appeal and the sales appeal of a patty that maintains its round shape during cooking so that it can be centered in a bread bun or the like to give a very pleasing appearance or when served as a steak have the attractive appearance of a perfectly circular patty. This invention provides an apparatus for molding a round patty of plastic food material that maintains its round condition during processing including cooking.

The most pertinent prior art of which applicant is aware is assignee's U.S. Pat. No. 3,491,401 of Jan. 27, 1970 and U.S. Pat. No. 1,757,447 dated May 6, 1930.

SUMMARY OF THE INVENTION

In this invention the customary closure members on opposite ends of a circular mold cavity into which the plastic food material is injected under pressure for forming the round patty is provided in at least one of these closure members with angled guide means which are preferably arcuate and with each having a vertex at the opening through which the pressurized material flows into the cavity and each having diverging sides extending from this vertex. In one practical embodiment of the invention as illustrated herein and angled guide means are arcuate such as concentrically circular and there are at least two with the one with the largest radius having an outer edge adjacent the circular side wall of the round mold cavity.

BRIEF DESCRIPTION OF THE DRAWINGS

FIG. 2 is an enlarged longitudinal and vertical sectional view through the apparatus of FIG. 1 omitting certain elements for clarity of illustration.

FIG. 3 is a view similar to FIG. 2 but showing the mold at a discharge station or at a position opposite to the position of FIG. 2.

DESCRIPTION OF THE PREFERRED EMBODIMENT

Figure 1:
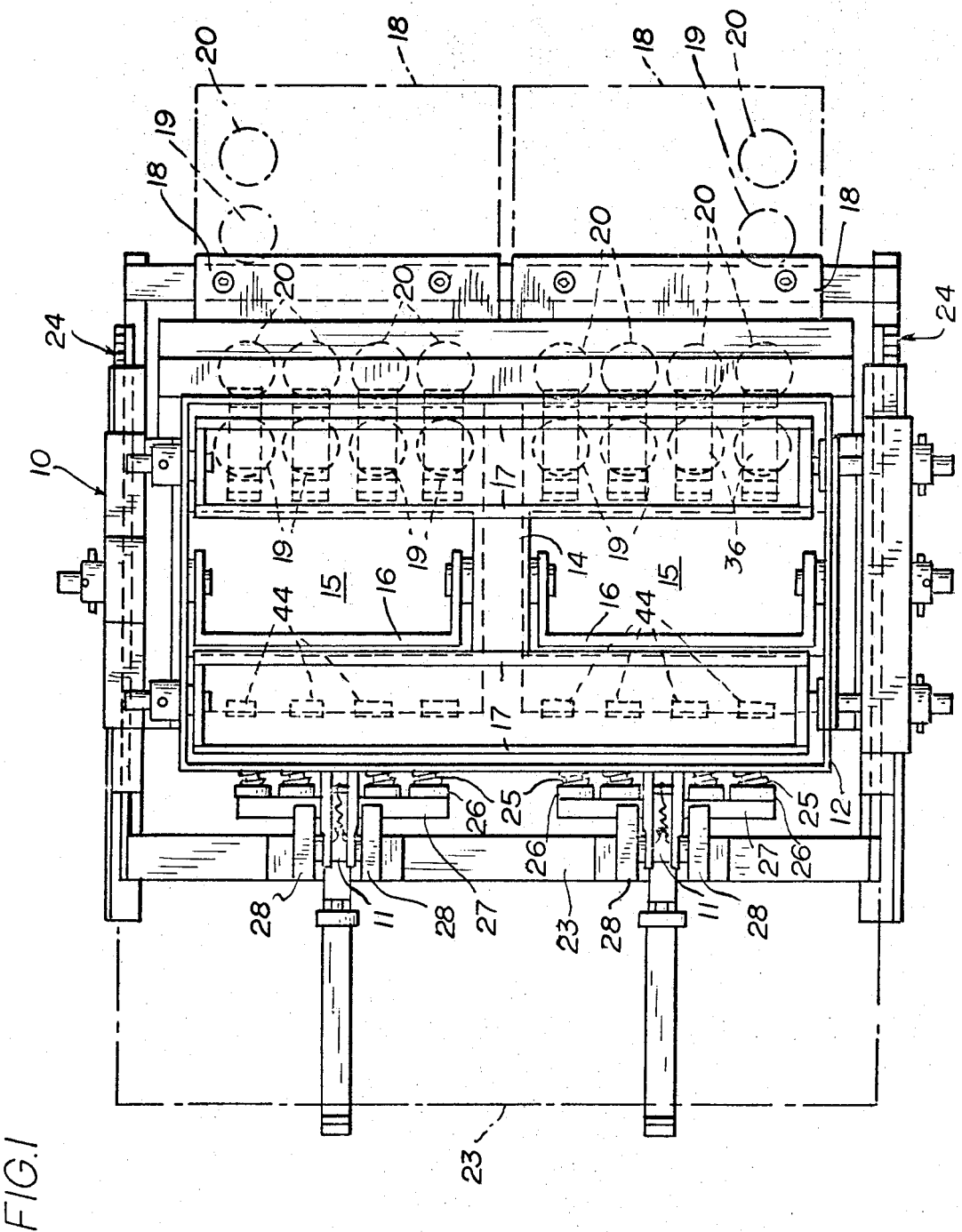
FIG. 1 is a plan view of a multiple patty forming apparatus embodying the invention and forming sixteen circular patties of ground raw beef or other food material simultaneously.

The molding apparatus 10 itself is substantially the same as the apparatus shown, described and claimed in U.S. Pat. No. 3,654,665 except for an improved catch structure 11 that is shown, described and claimed in James A. Holly patent application Ser. No. 153,376, filed June 15, 1971. The molding apparatus is also similar to the apparatus for producing multiple rows of patties shown, described and claimed in the copending Holly and Schneider patent application Ser. No. 178,654, filed Sept. 8, 1971, with this patent and these applications being assigned to the present assignee.

The apparatus 10 shown in the drawings includes a hopper 12 having a bottom section 13 divided by a central partition 14 so as to provide two halves in each of which is located a horizontally reciprocable ram 15. In order to provide for a smooth uninterrupted flow of moldable material and particularly adhesive food material such as ground meat downwardly in the hopper to the rams 15 there are provided arcuately reciprocable agitators 16 in each hopper bottom section above the rams 15 and a pair of rotatable mover devices 17 above and on opposite sides of the agitators 16. These agitators and mover devices and the operating means therefor are disclosed and claimed in the above U.S. Pat. No. 3,654,665.

As disclosed in enlarged detail in FIGS. 2 and 3 there is provided at least one mold plate 18, and in this disclosed embodiment a pair of side-by-side mold plates, each containing a plurality of sets (here shown as two) of side-by-side mold openings 19 and 20. In the illustrated embodiment the mold openings 20 are located forwardly of the mold openings 19 so that there are thus provided two rows of eight openings for forming 16 patties simultaneously.

As is explained in more detail and claimed in the above patent and copending applications the mold plates 18 are reciprocated between a charging station illustrated in FIG. 2 and a discharging station shown in FIG. 3. At the discharging station there are provided two sets of the customary knockout rings illustrated schematically at 21 which are lowered simultaneously into the mold openings 19 and 20 for dislodging the formed patties 22 therefrom. As the knockout rings and the operating mechanism therefor are not essential to the present invention as claimed they are not illustrated in detail.

The mold plates 18 are reciprocated from the position of FIG. 2 to the position of FIG. 3 and back again in timed sequence while at the same time the rams 15 are reciprocated so that at the charging station the rams are in their forward positions as shown in FIG. 2 while at the discharging station the rams 15 are at their greatest retracted positions as shown in FIG. 3. The apparatus for reciprocating the ram or rams 15 which is shown in greater detail and claimed in the above U.S. Pat. No. 3,654,665 includes a horizontal bar 23 that is reciprocated by side drive racks and pinions 24 between a forwardmost position as shown in FIG. 2 and in solid lines in FIG. 1 and a rearwardmost position of the bar 23 as shown in FIG. 3 and in broken lines at the left side of FIG. 1.

Also as illustrated and claimed in the above U.S. Pat. No. 3,654,665 there are provided precompressed springs 25, adjustable nuts 26 for applying the desired degree of precompression and cross bars 27 for each ram 15.

In order to retain each ram 15 in its forwardmost position of FIG. 2 until the mold plate has been moved forwardly away from the charging station there is provided the catch 11 and retainer 28 for each ram 15.

As can be seen from the above description the mold openings 19 and 20 are arranged in pairs in which one opening 20 of a pair is located generally longitudinally forwardly of the other opening 19. Each ram 15 there-upon functions as a pressure exerting part of a supply means for supplying the moldable and flowable plastic material such as ground meat 29 under pressure to the openings.

Thus, as illustrated in FIGS. 1 and 2, at the charging station the rams 15 are in their forwardmost positions to extend into the bottom section 13 of the hopper 12 to force material from the space 30 in front of the forward end 31 of the ram, down into and rearwardly through a channel 32 in a top plate base member 33, down through a passage means 34 in the form of a transverse slot in the mold plate 18 and into the entrance end 35 of an elongated manifold 36 in a bottom base member. The mold plate 18 is thereby mounted for reciprocation between the base members 33 and 37 with the bottom base member 37 being supported by a frame plate 38.

Each manifold 36 has a pair of upwardly extending spaced passages 39 and 40 leading to the mold openings 19 and 20, respectively, at the rear edges thereof when each mold plate 18 has been retracted to its charging position as shown in FIG. 2. As is explained in more detail in the above U.S. Pat. No. 3,654,665 the rack and pinion drives 24 reciprocate the rams 15 forwardly as indicated by the arrow 41 while the mold plates are reciprocated rearwardly as indicated by the arrow 42. It is of course evident that in the position of FIG. 2 each ram 15 and each mold plate 18 are temporarily stationary to provide for filling the mold openings 19 and 20.

The one base member 33 is located on the upper side of the mold plate 18 that is adjacent the pressurized material supply means 29-32 with the passage means 34 communicating with this supply means when the mold plate is in charging position. The other or bottom base member 37 is located at the side of the mold plate opposite to the supply means of at the bottom of the mold plate. It is in this bottom base member 37 in the illustrated embodiment that the manifold 36 with its entrance 35 and spaced filling passages 39 and 40 are located. With this structure the area 43 of the mold plate adjacent to or here just to the rear of the passage 34 operates as a valve to close off the supply means passage 32 as soon as the mold plate 18 has been moved forwardly a short distance toward the discharge position of FIG. 3. As is pointed out earlier, the catch structures 11 maintain the rams 15 in their forwardmost positions until the mold openings have been moved away from the charge positions. Thus the mold plate area 43 serves as a valve to aid this maintaining of the compression on the material in the manifold 36 and thus on the patties 33 so that the meat cannot expand back into the space 30 ahead of the ram 15.

With the meat in the manifold 36 and passages 39 and 40 being thusly maintained under pressure it has been found preferable to release this pressure before the mold openings and particularly the openings 19 have been returned to their charging position of FIG. 2 from the discharging position of FIG. 3. This is true because with the material and particularly meat which is somewhat compressible because of trapped air between the meat particles there is a tendency for this pressure to be released into the empty mold opening 19 as it starts to pass over the first manifold passage 40. This releasing of pressure into the mold opening 19 forces a slug of meat into the mold which then does not blend into the incoming meat entering the mold opening 19 at the manifold passage 39. When this occurs there is a tendency for the meat patty during cooking to break in view of the non-uniformity of the meat in the opening.

In order to avoid this each mold plate 18 is provided with a transverse pressure relief slot 44 a distance rearwardly of each rear mold opening 19 so that when the mold plate 18 is in its forwardmost or discharge position of FIG. 3 the pressure relief slot 44 will connect the entrance end 35 of the manifold with the material supply space 30. This permits the pressure in the manifold 36 to be relieved by flow of material rearwardly and upwardly into the space 30. Then when the mold plate 18 has been fully retracted to its loading position of FIG. 2 each mold opening 19 can be filled with the same uniformity as the companion mold opening 20.

In the illustrated embodiment there are aligned pairs of mold openings 19 and 20 each provided with its own supply passage 30 and 32 and manifold 36 and each with its own pressure relief slot 44. During the operation of the apparatus each ram 15 is reciprocated between the forward position of FIG. 2 and the rearward position of FIG. 3 and back again in repeating cycles. Simultaneously the mold plate 18 is reciprocated between the charging position of FIG. 2 and the discharging position of FIG. 3 and back again. During each reciprocation the forward position of each ram 15 forces material 29 into the pairs 19 and 20 of mold openings by way of the plurality of manifolds 36. Then, on movement of the mold plate 18 forwardly to the discharge position of FIG. 3 the confined pressure in the manifold 36 is released back into the hopper bottom 13 by way of the pressure relief slots 44 as shown in FIG. 3.

Figure 4:
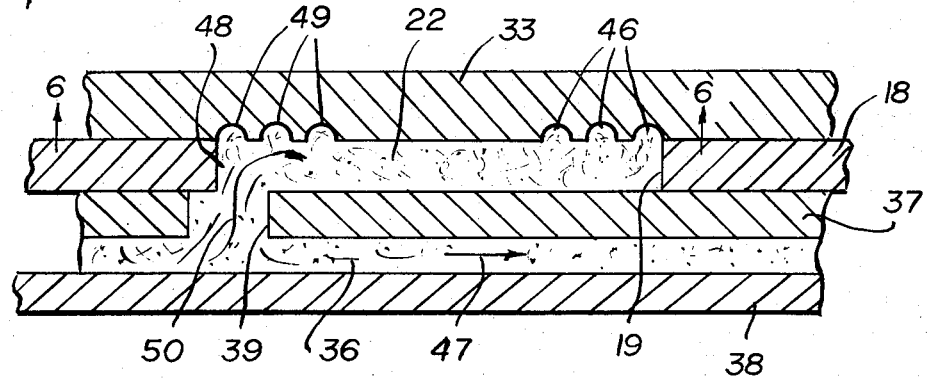
FIG. 4 is an enlarged sectional fragmentary detailed view illustrating one embodiment of the angled guide means of the invention.
Figure 6:
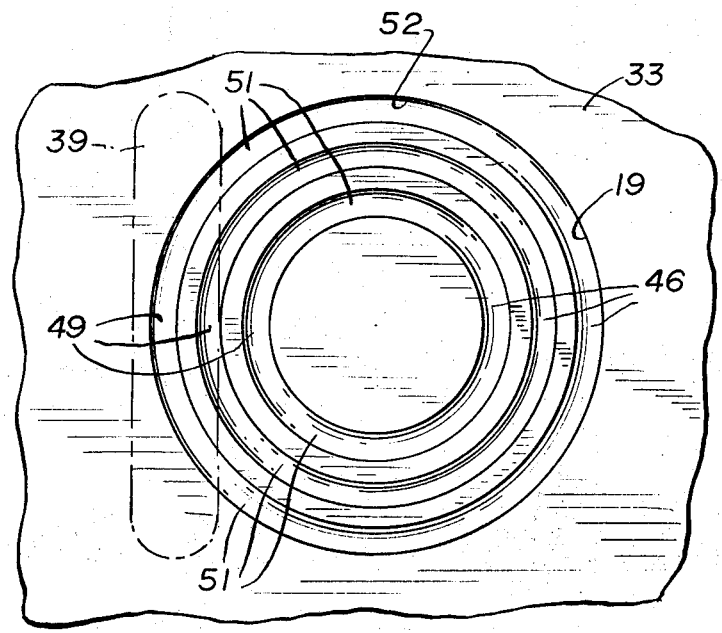
FIG. 6 is a sectional view taken substantially along line 6—6 of FIG. 4.

In the embodiment illustrated in FIGS. 4 and 6 the top base member 33 is provided with concentric circular grooves 46 of which three are used in this embodiment. These grooves are concentric with each other and with the center of the circular wall defining the mold opening 19 and each mold opening 19 and 20 is opposite a set of these grooves when the openings are in filling position as illustrated by the solid line position of the mold plate 18 in FIG. 1 and in FIGS. 4 and 6. With these grooves as the plastic material such as ground meat flows forwardly in the passage manifold 36 as illustrated by the arrow 47 a portion of the pressurized meat is diverted upwardly through the passage 39 into the end 48 of the mold opening 19 that is in register with the elongated feed passage or exit opening 39. Because the vertex 49 of each groove 46 with relation to the flow of pressurized meat indicated by the arrow 50 is adjacent this opening 39 the meat is immediately tumbled, intermixed and directed by the diverging sides 51 of the arcuately angled guide grooves 46 toward the transverse portions 52 of the mold opening side wall defining the outer extremity of the mold cavity 19. Then the arcuate portions of these guide grooves on the side of the mold openings 19 and 20 opposite the inlet passages 39 and 40 further direct the meat flow in an intermingling pattern. The result is that the fibers of the fibrous containing food material are so thoroughly intermingled that the resulting patties 22 when processed including cooking shrink uniformly to maintain their round shape and pleasing appearance.

Figure 5:
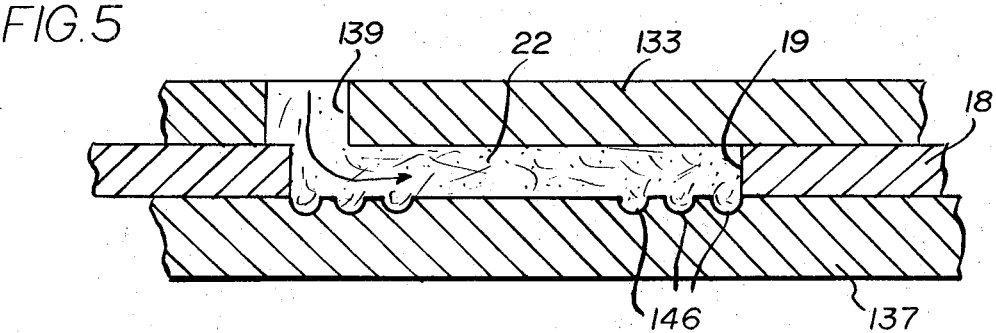
FIG. 5 is a view similar to FIG. 4 but illustrating a second embodiment of the guide means.

In the embodiment of FIGS. 4 and 6 the angled guide means 46 in the form of the grooves shown are in the upper base member 33. In the embodiment of FIG. 5 the grooves 146 are in the bottom base member 137 while the upper base member 133 is free of grooves. It is of course possible to provide the sets of grooves in both base members but this ordinarily is not required.

As is illustrated most clearly in FIG. 6, the vertexes 49 which by definition are the portions of the grooves closest to the transversely extending passage or exit opening 39 lie substantially on a diameter of the corresponding circular mold opening 19 with this diameter bisecting the passage 39. FIG. 6 also illustrates a preferred structure in which the center of the elongated opening 39 is substantially on a chord of the circle defined by the mold opening side wall at the periphery of the mold opening 19.

As illustrated by the arrow 50 in FIG. 4 the pressurized plastic food material first flows through the opening illustrated at 39 at generally right angles to the plane of the patty 22 that is being formed in the mold opening. Once into the opening 19 the material then makes a right angle turn in filling the extremities of the mold opening. It is then that the grooves 46 have the tumbling and intermixing effect to distribute the fibers of the meat or similar food material completely randomly with resulting uniform shrinkage during processing. In the preferred structure there are from two to four arcuate grooves such as the circular grooves 46 used depending upon the size of the patties. The smaller the patties the fewer the number of grooves while the larger the patties the greater the number of grooves. The outermost groove of the set 46 has an outer edge substantially coinciding with the outer wall defining the mold opening 19 while the smallest groove 46 is spaced a substantial distance from the center of the mold cavity as shown in both FIGS. 4 and 5.

In one embodiment of the invention which is very succesful in producing large numbers of ground beef patties per hour with the patties shrinking substantially uniformly during cooking to maintain their round shape the smallest groove at the center had a radius of about 1.75–2.00 inches and successive grooves were spaced about one-eighth inch apart to the edge of the mold cavity as illustrated in the drawings. Where the spacing was one-eighth inch apart the grooves themselves were on a ⅛ inch radius in cross section curvature. In a similar embodiment the grooves were 3/16 inch radius in cross section and were spaced three-sixteenths inch apart.

Having described my invention as related to the embodiments shown in the accompanying drawings, it is my intention that the invention be not limited by any of the details of description, unless otherwise specified, but rather be construed broadly within its spirit and scope as set out in the appended claims. I claim:

1. Apparatus for molding a round patty of plastic food material that shrinks during cooking, comprising: supply means for providing a supply of plastic material having an exit opening; a mold having a round mold cavity with a circular side wall, said cavity being adapted to communicate with said exit opening to receive said plastic material therefrom for filling said cavity for forming said patty; a closure member at one side of said mold cavity during said communicating; means for applying pressure to said plastic material to force the material in a stream from the exterior of said cavity through said exit opening into said cavity; and angled guide means in said closure member having a vertex at said exit opening and diverging sides extending therefrom.

2. The apparatus of claim 1 wherein said angled guide means comprise a plurality of arcuately sloped guides having vertexes adjacent to but spaced from each other.

3. The apparatus of claim 2 wherein said vertexes lie substantially along a diameter of said cavity that bisects said exit opening.

4. The apparatus of claim 2 wherein each said arcuately sloped guide means follows substantially the arc of a circle.

5. The apparatus of claim 2 wherein there are provided a plurality of said sloped guide means spaced from each other between said side wall and the center of said cavity.

6. The apparatus of claim 5 wherein said plurality of guide means comprise spaced concentric circular grooves of diminishing diameter from adjacent said side wall toward said center.

7. The apparatus of claim 1 wherein said exit opening is smaller than said cavity and located adjacent said side wall during said filling, with the result that said material fans out from said opening into said cavity.

8. The apparatus of claim 7 wherein exit opening is located adjacent said sidewall during said filling and said guide means are sloped from said exit opening toward the side wall in the initial region adjacent the opening and then toward the opposite end of the cavity in the terminal region spaced from said opening and said initial region.

9. The apparatus of claim 1 wherein said exit opening is located adjacent said side wall during said filling and said guide means is in the form of concentric spaced grooves in said end wall that are substantially concentric to each other and to said side wall of the cavity.

10. The apparatus of claim 1 wherein said exit opening is elongated with a center lying substantially on a chord of said cavity during said filling, and with the width of said opening overlapping the adjacent edge area of said cavity.

11. The apparatus of claim 10 wherein said exit opening and said end wall are on opposite sides of said cavity.

12. Apparatus for molding a round patty of plastic food material that shrinks during cooking, comprising: supply means for providing a supply of plastic material having an exit opening; a mold having a round mold cavity with a circular side wall, said cavity being adapted to communicate with said exit opening to receive said plastic material therefrom for filling said cavity for forming said patty; a closure member at one side of said mold cavity during said communicating; means for applying pressure to said plastic material to force the material in a stream from the exterior of said cavity through said exit opening into said cavity; and angled guide means in said closure member comprising a plurality of arcuately angled guide means each following the arc of a circle and all having vertexes lying substantially along a diameter of said cavity that bisects said exit opening.

13. The apparatus of claim 12 wherein said guide means are substantially concentric to said cavity.

14. The apparatus of claim 13 wherein said plurality of guide means comprise spaced concentric circular grooves of diminishing diameter from adjacent said side wall toward said center.

15. The apparatus of claim 14 wherein said exit opening is elongated with a center lying substantially on a chord of said cavity during said filling, and with the width of said opening overlapping the adjacent edge area of said cavity and said exit opening and said closure member are on opposite sides of said cavity.

* * * * *